United States Patent [19]

Linderfelt

[11] Patent Number: 4,631,921
[45] Date of Patent: Dec. 30, 1986

[54] FLOAT FOR WAVE ENERGY HARVESTING DEVICE

[76] Inventor: Hal R. Linderfelt, 5540A Sosiega, Laguna Hills, Calif. 92653

[21] Appl. No.: 762,445

[22] Filed: Aug. 5, 1985

[51] Int. Cl.[4] .............................................. F03B 13/12
[52] U.S. Cl. .......................................... 60/501; 290/53
[58] Field of Search .................................. 60/497–507; 290/53

[56] References Cited

U.S. PATENT DOCUMENTS

| | | | |
|---|---|---|---|
| 1,502,511 | 7/1924 | Marvin | 60/501 |
| 4,073,142 | 2/1978 | Tornabene | 60/505 |
| 4,277,690 | 7/1981 | Noren | 60/501 |
| 4,302,161 | 11/1981 | Berg | 60/505 |
| 4,447,740 | 5/1984 | Heck | 60/501 X |
| 4,462,211 | 7/1984 | Linderfelt | 60/501 |

*Primary Examiner*—Allen M. Ostrager
*Attorney, Agent, or Firm*—K. H. Boswell

[57] ABSTRACT

A float for supporting a submerged wave energy harvesting device includes a conical member which is buoyant on the surface of the body of water with its base located upwardly above the surface of the body of water and its apex submerged just below the surface of the body of water. The wave energy harvesting device extends downwardly from the apex of the conical member and is connected to the conical member utilizing a connecting member which allows for pivoting of the conical member with respect to the wave energy harvesting device as the conical member rocks or otherwise moves in response to wave motion on the surface of the body of water. An electrical generator is located within the interior of the conical member and is connected to the wave energy harvesting device so as to be powered by the wave energy harvesting device. Supplemental positioning floats each connected to an anchor can be positioned in a geometrical configuration around the conical member with a tether connected between the conical member and each of the supplemental floats to maintain both the conical member and the wave energy harvesting device in a fixed position with respect to an ocean floor, a lake bed, or the like.

13 Claims, 4 Drawing Figures

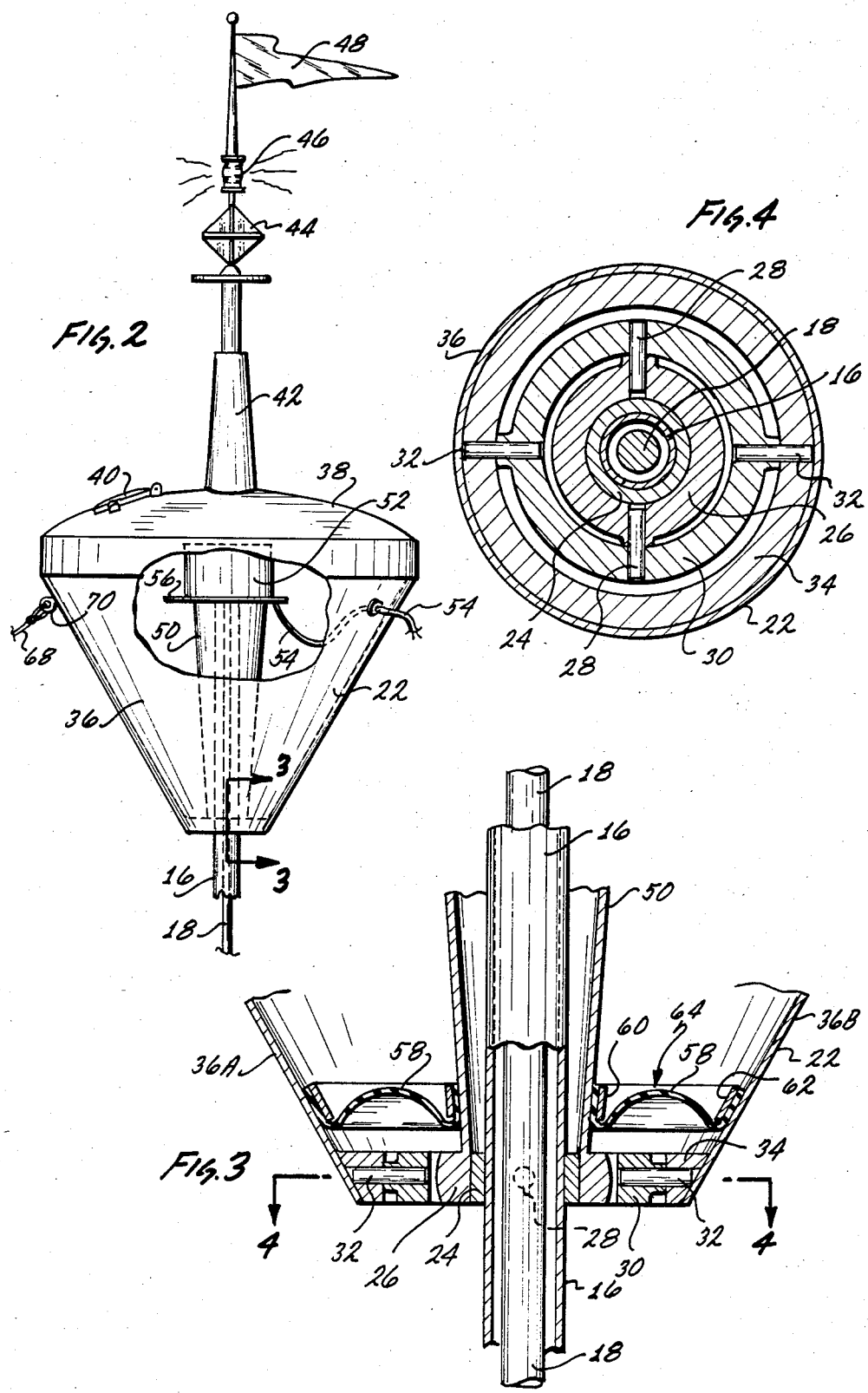

FLOAT FOR WAVE ENERGY HARVESTING DEVICE

BACKGROUND OF INVENTION

This invention is directed to a flotation system for a wave harvesting device. The flotation system includes a conical shaped float having a submergible wave energy harvesting device attached to its apex such that the apex of the conical shape is downwardly oriented and the base of the conical shape is upwardly oriented.

With the introduction of utilization of electrical energy in the late 1800s, man has sought a number of ways to generate electricity. One of the earliest ways examined for generating electrical power was wave energy. Not too much longer thereafter, however, petroleum became very available, and this, in combination with hydroelectrical electrical generation, soon relegated wave energy to the position of being only a curiosity.

With the recent realizations that fossil fuel sources are of a limited supply, alternative forms of electrical energy generation have been sought. In my U.S. Pat. No. 4,462,211, I describe an apparatus for harvesting wave energy. The apparatus or device described therein takes advantage of the fact that wave energy for the most part is a surface phenomena, and, depending upon the depth of the water, water below the surface does not necessarily move in association with the wave motion on the top of the surface of the body of water.

The device I describe in my U.S. Pat. No. 4,462,211, utilizes two counter-rotating turbines which, in turn, rotate counter-rotating shafts leading from the turbines to the surface of the water.

The counter-rotating turbines of the device of my patent, U.S. Pat. No. 4,462,211, are raised and lowered at a depth below the surface of the water by wave action of a float floating on the surface of the water to which the shafts are attached. At the surface, motion from one of the shafts is reversed and combined with rotation of the other shafts and is transferred to a generator for the generation of electrical energy.

The wave harvesting device described in my patent is attached to an essentially flat surface float. As described in my U.S. Pat. No. 4,462,211, the turbines and the shafts of that device essentially remain in a vertical orientation irrespective of movement of the float as it follows the wave action on the surface of the body of water.

Dating back to antiquity, many designs for floats have been utilized. While platform floats, such as the one I describe in my U.S. Pat. No. 4,462,211, have a large surface area, at all times they have a constant displacement. Because of this constant displacement and their own inertia, when they are subjected to a rising wave, they tend to sink into the wave. And when they are subjected to a descending wave, the wave tends to drop out from beneath them. This same effect is true of other floats or buoys which also have a substantially constant displacement. This mitigates the wave action, tending to decrease the energy harvesting action of any device attached to these floats.

Because waves vary in their length from nothing in calm water to very long waves, a flat float is subjected to varying horizontal forces. In order to maintain the integrity of the float during the most severe conditions, ribs, keels, bulkheads, or other supporting structures must be engineered into flat floats. Inevitably, with the addition of strength also comes the addition of weight, and the float must support not only the wave energy harvesting device beneath it, but its own structural weight. This further mitigates the efficiency of the float.

BRIEF DESCRIPTION OF THE INVENTION

In view of the above, it is evident that there is a need for new and improved floats and flotation systems which can appropriately suspend a wave energy harvesting device in a body of water. It is therefore a broad object of this invention to fulfill this need. It is a further object of this invention to provide for floats and flotation systems which are capable of responding to waves of minimal height efficiently to move a wave energy harvesting device. Additionally, it is an object of this invention to provide a float and a flotation system which, because of the engineering principles contained therein, is inherently stable, strong, light, and responsive to a variety of wave conditions.

These and other objects, as will become evident from the remainder of this specification, are achieved in a float for supporting a submerged device in a body of water which comprises: a buoyant conical member capable of floating on said body of water with its base above the surface of said body of water and its apex submerged in said body of water; cap means located on said base of said conical member, said cap means for essentially sealing the interior of said conical member to ingress of water into said interior of said conical member; device connecting means located on said conical member, said device connecting means for connecting said device to said conical member, said device connecting means located on said conical member whereby said device submerged in said body of water extends from the apex of said conical member.

Further, these objects are achieved in a flotation system for supporting a submerged device in a body of water which comprises: a central float body, at least three supplemental float bodies, a plurality of tether means equal in number to the number of said supplemental float bodies and a plurality of anchor means equal in number of said supplemental float bodies; each of said tether means connecting between one of said supplemental float bodies and said central float body; each of said anchor means connecting to one of said supplemental float bodies.

BRIEF DESCRIPTION OF THE DRAWINGS

This invention will be better understood when taken in conjunction with the drawings wherein:

FIG. 2 is a side elevational view in partial section of the central float of the device of FIG. 1;

FIG. 3 is a side elevational view in section about the line 3—3 of FIG. 2; and

FIG. 4 is a plan view in section about the line 4—4 of FIG. 3.

Figure 1:
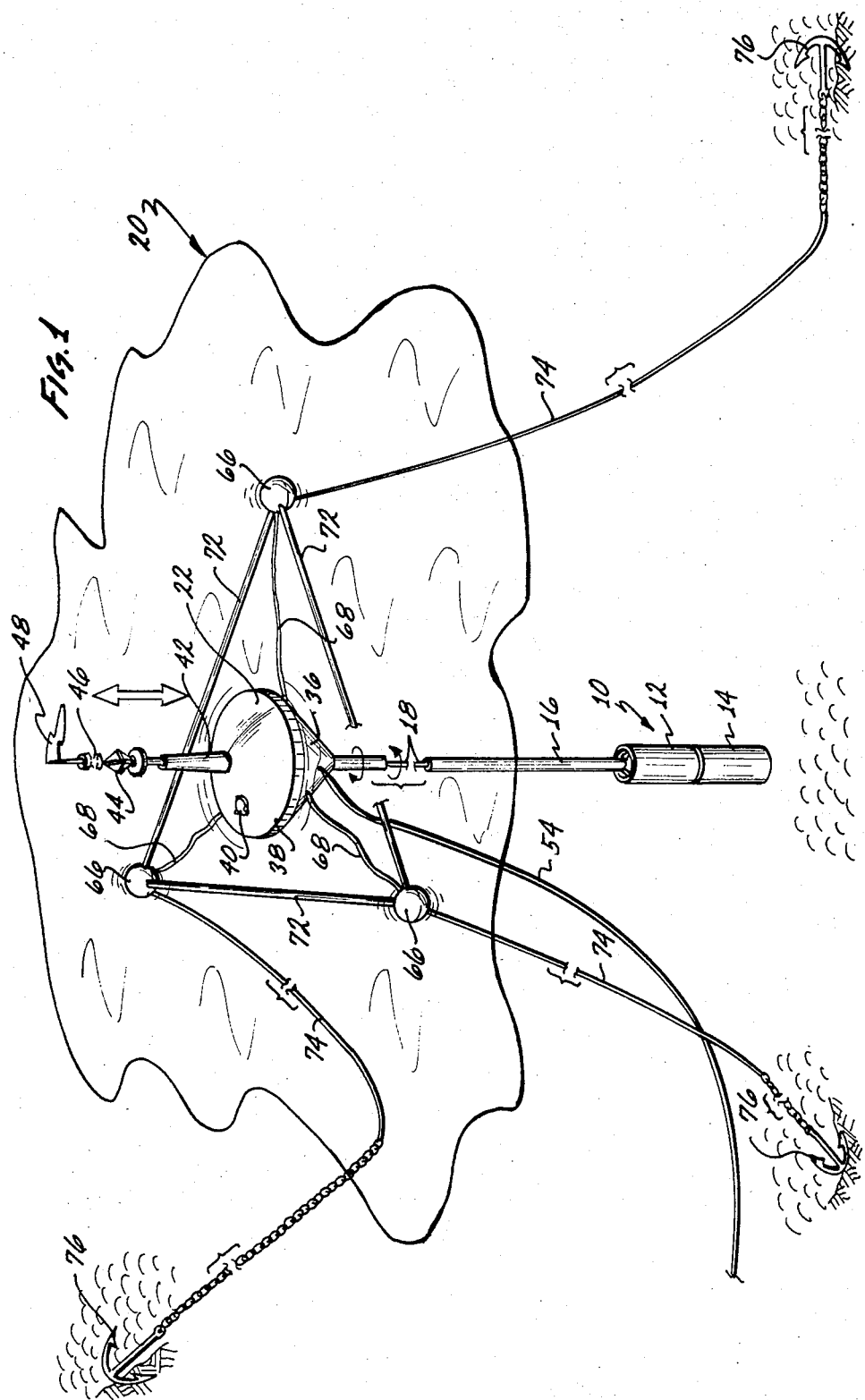
FIG. 1 is a pictorial representation of my flotation system coupled with a wave energy harvesting device as it would appear when appropriately anchored in a large body of water.

The device shown in the drawings and described in this specification utilizes certain principles and/or concepts as are set forth in the claims appended hereto. Those skilled in the engineering arts will realize that these principles and/or concepts are capable of being utilized in a variety of embodiments which may differ from the exact embodiment shown for illustrative purposes. For this reason, this invention is not to be construed as being limited solely to the illustrative embodiment, but is only to be construed in view of the claims.

DETAILED DESCRIPTION

FIG. 1 shows a wave energy harvesting device 10 essentially as is described and shown in my U.S. Pat. No. 4,462,211, the entire disclosure of which is herein incorporated by reference. This device 10 utilizes two counter-rotating cylinders 12 and 14 each which includes a turbine, not numbered or shown, located in the interior. The turbine within cylinder 12 is attached to outer shaft 16, and the turbine within cylinder 14 is attached to an inner shaft 18. As is described in my above referred to patent, the turbine blades in the turbines within the cylinders 12 and 14, are set at opposite angles of attack to water either moving up through the two cylinders 12 and 14, or down through the cylinders 12 and 14. Because of this, as the device 10 is raised or lowered within a body of water, generally depicted by the numeral 20, the cylinder 12 and the shaft 16 attached thereto rotate in one direction, and the cylinder 14 and the shaft 18 attached thereto rotate in the opposite direction.

The two shafts, 16 and 18, are attached to a central float body 22. As the central float body raises and lowers with respect to wave action on the surface of the body of water 20, the cylinders 12 and 14 are concurrently raised and lowered at a depth beneath the surface of the body of water 20. The turbine blades, as are described in my above referred to patent, flip or re-orient themselves depending upon whether the water is moving up through the two cylinders 12 and 14, or down through the two cylinders 12 and 14. This in turn depends upon whether or not the wave energy device 10 is being raised or lowered. In any event, in response to movement of the central float body 22 up and down as waves pass by it, the wave energy harvesting device 10 is activated so as to rotate shaft 16 in one direction and the shaft 18 in the opposite direction.

Because the shafts 16 and 18 of the wave energy harvesting device 10 are rotating, the device 10, including the shafts 16 and 18, are essentially held in a vertical orientation. The central float body 22, however, follows the crests, slopes, and troughs of the wave, and pitches and yaws in response to this wave movement. It is therefore necessary to pivotally mount the shafts 16 and 18 to the float body 22, as well as rotatably mount the shafts 16 and 18 to the float body 22 to account for the rotation of the shafts.

As is described in my above referred to patent, the shafts 16 and 18 are appropriately journalled together at the lower end of the wave energy harvesting device 10. Further, as is also described in my patent, the rotation direction of one of the shafts is reversed at the joining point of the shafts upper extremity such that rotation in a single direction can be outputted to an appropriate electrical generating device. The attachment of the upper ends of the shafts to the generating device is also as is described in my above referred to patent. For the remainder of this application it is sufficient to note that shaft 18 is appropriately journalled within shaft 16 and rotates opposite of the rotation of shaft 16.

As is best seen in FIGS. 3 and 4, outer shaft 16 has a circular bearing 24 attached thereto which rides within a bearing race 26. The bearing race 26 forms one part of a gimble or universal joint.

The bearing race 26 is appropriately suspended by trunnions, collectively identified by the numeral 28, in a circular collar 30. The collar 30 is suspended by trunnions, collectively identified by the numeral 32, in a further circular collar 34. The trunnions 28 are positioned 90° with respect to the trunnions 32, allowing for pivoting of the shafts 16 and 18 in any direction with respect to the collar 34.

The central float body 22 has an outer conical wall 36. It is truncated near its apex or bottom, as is seen in FIGS. 2 and 4, and the collar 34 is fixed within the inside radius of the apex end of the conical wall 36. In view of this, the shafts 16 and 18, and the wave energy harvesting device 10 appropriately suspended therefrom, are free to both rotate with respect to conical wall 36 of the central float body 22 by virtue of the bearing 24 and bearing race 26, and pivot by virtue of the collars 30 and 34 and the trunnions 28 and 34.

Completing the exterior of the central float body 22 is cap member 38. The cap member 38 is appropriately sealed to the conical wall 36 around its periphery. A hatch 40 is positioned on top of the cap 38 allowing access to the hollow interior of the central float body 22. The hatch 40 would be appropriately sealed when in its closed position so as to seal the interior of the central float body 22 to any wave action which may crest over the top of the central float body 22 preventing flooding of the interior of the central float body 22.

A super structure 42 can be attached on top of the cap 38. The super structure 42 would include an appropriate radar reflector 44, a visual and/or audio warning device 46, and, if appropriate, an identification banner 48. This would provide for identification of the central float body 22 both in fair and inclement weather by any vessels which may be in the immediate area. Since radar reflectors, such as radar reflector 44, visual and audio warning devices such as the device 46, and banners 48, are in common useage, for brevity of this specification, these will not be described further.

Located within the interior of the central float body 22 is an interior conical wall 50 having a much smaller conical angle than the conical angle of the central float body 22. The conical wall 50 completely surrounds the shafts 16 and 18. The bottom of the conical wall 50 is joined to the bearing race 26, and, as such, will always be in a fixed position with respect to the shafts 16 and 18. However, since the bearing 24, attaching to the outer shaft 16, pivots within the bearing race 26, the outer shaft 16 (as well as the inner shaft 18) will rotate with respect to the interior conical wall 50.

An appropriate electrical generator 52 is positioned on the top of the interior of the conical wall 50. The generator 52 is supported within the interior of the central float device 22 by the conical wall 50. Since, however, the conical wall 50, and the generator 52 attached thereto, are fixed with respect to the rotation of the shafts 16 and 18, the generator 52 does not rotate within the interior of the float body 22 and the rotational energy of the rotating shafts 16 and 18 can be utilized to drive the generator. An appropriate electrical connection, such as cable 54, leads from the generator 52 to the exterior of the central float body 22. The opening, wherein the cable 54 passes through the central float body 22, would, of course, be appropriately sealed against water ingress into the interior of the central float body 22. The cable 54 would also be of such a nature to operator within the aqueous environment.

An annular flange 56, which is of a diameter greater than the generator 52, is located at the attachment point of the generator 52 onto the interior conical wall 50.

This flange serves as an internal walkway for maintenance work in the generator 52.

The bottom of the interior conical wall 50 is sealed to the conical wall 36 utilizing an annular seal 58. A sealing ring 60 maintains the seal 58 against the interior of the conical wall 50, and a further sealing ring 62 maintains the annular seal 58 against the interior of the conical wall 36. The annular seal 58 is shaped so as to include an annular crest, shown at arrow 64, allowing for flexing of the annular seal 58 in response to movement of the shafts 16 and 18, and the interior conical wall 58, with respect to the wall 36 and the remainder of the central float body 22.

The central float body 22 floats on the surface of the body of water 20 and is thus exposed to wave action. The cylinders 12 and 14 of the wave energy harvesting device 10 are positioned well below the surface of the body water 20, below a point wherein the wave action extends. In response to vertical rising and falling of the central float body 22 by wave action, motion of the central float body 22 is transferred via shafts 16 and 18 by virtue of the attachment of the shaft 16 to the bearing 24. This moves the wave energy harvesting device 10 upwardly and downwardly within the body of the water 20. This causes rotation of the shafts 16 and 18 as is explained in my above referred to patent. This rotation is then transferred to the generator 52 to generate an appropriate electrical current.

Pitching and yawing of the central float body 22, however, is not transferred to the shafts 16 and 18 and to the wave energy harvesting device 10 because of the gimble formed by the collars 30 and 34 and the trunnions 28 and 32. The central float body 22 can pitch and toss in the waves as the crest and troughs of the waves move across it. As the float body 22 pitches and yaws in the waves, the conical wall 36 moves back and fourth about the interior conical wall 50, and the generator 52 attached thereto. The cable 54 is provided with sufficient scope within the interior of the float body 22 to allow for movement of the conical wall 36 away from and toward the generator 52.

The crest 64 in the annular seal 58 allow for flexing of the annular seal 58 in response to the pitching and yawing of the float body 22 in the waves. This maintains a water tight seal at the bottom of the float body 22 to the interior conical wall 50 and the bearing race 26 to which it is attached. The bearing race 26, in turn, forms a water tight seal with the bearing 24 allowing the bearing 24, and the shaft 16 attached thereto, to rotate within it, but preventing ingress of water into the interior of the interior conical wall 50. Alternately, not shown, the seal between the bearing 24 and the bearing race 26 would be less than water tight, and an upper seal above the surface of the water could be formed between the top of the interior conical wall 50 and the outer shaft 16.

Since the water pressure against the annular seal 58 is only dependent upon the depth of the seal 58 from the surface of the body of the water 20, there is very little hydraulic pressure on this seal. This allows for use of flexible rubber, or other suitable material, for the annular seal 58.

Additionally, since the interior of the float 22 is sealed by the hatch 40, the interior of the float 22 is essentially pressurized against entering of water through the submerged apex end of the float 22.

Referring back to FIG. 1, the central float body 22 is preferably suspended in a fixed position on the surface of the body of the water 20 utilizing supplemental floats, collectively identified by the numeral 66 in FIG. 1. Tether lines, collectively identified by the numeral 68, are attached to appropriate eyelets, identified by the numeral 70, positioned on the exterior of the conical wall 36 of the central float body 22.

Preferably, three supplemental floats 66 are utilized and are positioned in a triangular arrangement around the central float body 22. Connectors, collectively identified by the numeral 72, connect the supplemental floats 66 to one another to form this triangular orientation. The connectors 72 can either be stiff connectors which maintain the floats 66 at fixed distances from one another, or can be flexible allowing the floats to approach and then spread from one another depending upon the action on the surface of the body of the water 20. In any event, each of the supplemental floats 66 is connected by an anchor line, collectively identified by the numeral 74, to an appropriate anchor, collectively identified by the numeral 76, which is lodged in the earth surface beneath the body of water 20. If the connectors 72 are flexible, the scope of the anchor lines 74 can be such to limit the inward travel of the supplemental floats 66 towards one another.

As is shown in FIG. 1, a triangular arrangement utilizing three supplemental floats 66 is preferred. At least two supplemental floats 66 could be utilized and a greater number, as for instance four, could also be utilized. However, the triangular arrangement, as is shown in FIG. 1, assures both centralization of the central float body 22 within its holding anchor 76, and economy of materials. As is shown in FIG. 1, the central float body 22 is free to move within the triangular orientation formed by the supplemental float 66 and is maintained in positioned by the tether line 68.

If stiff members are utilized for the connectors 72, when the float body 22 moves, one or the other of the tether lines 68 are tense, maintaining the float body 22 in its desired positioned within the triangular orientation formed by the supplemental floats 66, but allows for full vertical movement of the float body 22 in response to the waves, crests, and troughs. Further, this allows for any pitching and yawing of the float body 22 in response to the wave action without any interference from the anchor lines 74.

As is evident from the symmetrical shape of the central float body 22, vertical movement of the float body 22 is independent of the direction of the advancing waves, and is immediately responsive to change in direction of these advancing waves.

Further, as noted before, because of the attachment of shafts 16 and 18 at the apex of the central float body 22, the float body 22 can pitch and yaw with respect to wave action while still maintaining shafts 16 and 18 essentially vertically oriented. Additionally, irrespective of the pitch or yaw of the float body 22, its vertical movement is always transferred to the shaft 16 and 18 so as to drive the wave energy harvesting device 10.

The system depicted in FIG. 1 is never unstable since all loads are located at the fulcrum at the apex of the central float body 22 wherein the interior conical wall 50 and the shafts 16 and 18 pivot with respect to the central float body 22.

Because of the conical shape of both the wall 36 and the wall 50, the structure is extremely rigid with a minimum of structural components which maximizes the buoyant force of the central float body 22 and, thus, allows for the use of a smaller central float body 22 to raise and lower the wave energy harvesting device 10.

The conical angle of the central float body 22 can be varied to account for different local environments. It is obvious that in certain locations waves of 2 feet may be the norm, wherein, in other locations, waves of 6 feet may be the norm. By increasing or decreasing the conical angle, that is the angle between the sides of the central float body 22, as for instance as seen in FIG. 3 comparing wall 36A to wall 36B, the buoyant force of the central float body 22 can be "tuned". Further, because of the conical shape of the central float body 22, it is more responsive to wave action than other shapes of floats.

Archinedes principle states that the buoyant force of a body is equal to the weight of the fluid it displaces. If a body is not wholly submerged in the fluid, the buoyant force is equal to the volume of fluid which is displaced by the submerged portion of the body. If conical walls 36 have a circular base, neglecting the truncated end at the apex of the float body 22, the submerged volume of the float body 22 will be $\frac{1}{3}\pi r^2 s$, where r is the radius of the body at the waterline, and s is the altitude from the waterline to the apex of the conical wall.

As an example, if a central float body 22 is chosen so as to have a 60° conical angle, and the wave energy harvesting device 10 is of a sufficient mass so as to submerge the central float body 22 to a point wherein the waterline is 10 meters above the submerged apex of the central float body 22, the radius of the submerged portion at the waterline would equal 5.77 meters. The submerged portion of the central float body 22 would displace approximately 349 meters$^3$ of water exerting a buoyant force of approximately 788,000 lbs. If a two meter wave then travels across the float body 22 and, under the inertia of the wave energy harvesting device 10, the central float body 22 remains fixed with respect to its horizontal position, the waterline would then move up to the 12 meter mark and the radius at this waterline would now be 6.93 meters. The volume of water displaced by the submerged portion of the central float body 22 is now approximately 603 meters$^3$ which would exert a buoyant force of approximately 1,363,000 lbs. This represents a 73% increase in the buoyant force. It is evident that, because of the conical shape of the central float body 22, the buoyant force is dependent upon the depth of submersion of the central float body 22.

Because of the effects described in the previous paragraph, movement of a very small wave beneath the central float body 22 easily overcomes the inertia of the totality of the float body 22, and the wave energy harvesting device 10 attached thereto, to make it very responsive to the wave action, moving the wave energy harvesting device 10 upwardly and downwardly to rotate the shafts 16 and 18 in the presence of extremely small waves. This accounts for the increase efficiency of the flotation system of this invention with respect to other floats.

It is also evident that, by changing the conical angle of the float body 22, a greater or a lesser buoyant force can be achieved for a particular size wave. In those areas which experience small waves, the buoyant force would be optimized by increasing the conical angle of the central float body 22; and in those areas wherein waves of greater height are commonplace, the conical angle of the central float body 22 could be decreased allowing the vertical movement of the central float body 22 to be less responsive to the large wave heights to essentially tune the wave energy harvesting device 10 with respect to local wave conditions.

The cable 54 leading from the generator 52 is shown as a submerged cable in FIG. 1. However, other forms of energy transmission could be utilized, such as a floating cable or even storage batteries located within the interior of the central float body 22 or in a nearby float tethered to the flotation system of this invention.

I claim:

1. A float for supporting a submerged device in a body of water which comprises:

a buoyant conical member capable of floating on said body of water with its base above the surface of said body of water and its apex submerged in said body of water;

a cap means for essentially sealing the interior of said conical member to ingress of water through said base of said conical member into said interior of said conical member, said cap means located on said base of said conical member;

device connecting means for pivotally and rotatively connecting said device to said conical member, said device connecting means located on said apex of said conical member whereby said device submerged in said body of water extends from the apex of said conical member;

said device connecting means includes pivoting means for pivotally connecting said device to said conical member whereby said device is capable of pivoting with respect to said conical member in response to movement of one of said device and said conical member with respect to the other of said device and said conical member under the influence of wave and tidal motion of said body of water;

said device connecting means further includes device rotating means for operatively rotatively connecting said device to said conical member whereby said device can rotate with respect to said conical member in response to rotational motion imparted to said device with respect to said conical member resulting from rotation of one of said device and said conical member with respect to the other of said device and said conical member;

electrical generating means for converting mechanical energy into electrical energy;

said device connecting means further includes a support means for movably supporting and positioning said electrical generating means within the interior of said conical member in operative association with at least a portion of said device extending into the interior of said conical member through said apex of said conical member, said support means operatively connected to said device pivoting means so as to pivot in conjunction with said pivoting means in response to movement of said conical member with respect to said device whereby, with respect to pivotal motion of said device with respect to said conical member, said electrical generating means is maintained in a fixed position with respect to said portion of said device extending into the interior of said conical member.

2. The float of claim 1 further including:

apex sealing means associated with said apex of said conical member and said device connecting means, said apex sealing means for sealing said apex of said conical member against the ingress of water into said conical member through said apex of said conical member.

3. Device of claim 1 further including:
super structure means located on said cap means, said super structure means including signal means for identifying said float means as said float means floats on said surface of said body of water.

4. The float of claim 1 further including:
at least two supplemental float means, at least two tether means, and at least two anchor means;
each of said tether means connecting said conical member to one of said supplemental float means;
each of said anchor means connecting to one of said float means and to the earth surface below said body of water.

5. The float of claim 4 including:
three supplemental float means, three tether means, and three anchor means;
each one of said tether means connecting said conical member to one of said supplemental float means;
each one of said anchor means connecting one of said supplemental float means to the earth surface beneath said body of water.

6. The float of claim 5 further including:
supplemental float means connecting means, said supplemental float means connecting means connecting each of said supplemental floats to said other two supplemental floats in a triangular orientation;
said conical member positioned in said triangular orientation of said supplemental float means.

7. The float of claim 2 further including:
said apex sealing means operatively connecting between said support means and said conical member so as to maintain a fluid tight seal between said support means and said conical member.

8. The float of claim 1 wherein:
said pivoting means includes a gimbal means for pivotal motion, said gimbal means located proximal to said apex of said conical member;
said support means attaching to said gimbal means whereby said support means is capable of pivoting with respect to said conical member.

9. The float of claim 8 wherein:
said rotating means includes a bearing means for rotary motion, said bearing means operatively associated with said gimbal means and said portion of said device extending into the interior of said conical member, said bearing means forming a journal in said gimbal means for said portion of said device extending into the interior of said conical member.

10. The float of claim 8 wherein:
said support means comprises an interior wall formed as a surface of rotation and located in the interior of said conical member, said wall attaching to a portion of said gimbal means so as to be movable with respect to said conical member within the interior of said conical member.

11. The float of claim 10 wherein:
said wall is a conical wall.

12. The float of claim 11 wherein:
said conical wall is formed so as to have a smaller conical angle than the conical angle of said conical member.

13. The float of claim 10 including:
apex sealing means for sealing said apex of said conical member against the ingress of water into said conical member, said apex sealing means extending between said interior wall and the inside surface of said conical member.

* * * * *

UNITED STATES PATENT AND TRADEMARK OFFICE
CERTIFICATE OF CORRECTION

PATENT NO. : 4,631,921

DATED : DECEMBER 30, 1986

INVENTOR(S) : HAL R. LINDERFELT

It is certified that error appears in the above-identified patent and that said Letters Patent is hereby corrected as shown below:

Column 1, line 40, "shafts" should be --shaft--,

Column 4, line 65, "operator" should be --operate--,

Column 6, line 34, "float" should be --floats--,

Column 6, line 35, "line" should be --lines--,

Column 6, line 58, "shaft" should be --shafts--,

Column 7, line 15, "Archinedes" should be --Archimedes--,

Column 7, line 57, "increase" should be --increased--.

Signed and Sealed this

Nineteenth Day of January, 1988

Attest:

DONALD J. QUIGG

*Attesting Officer*

*Commissioner of Patents and Trademarks*